Oct. 23, 1928.
H. E. CHRISTIE
1,688,852
CLUTCH DEVICE
Filed April 8, 1922     2 Sheets-Sheet 1
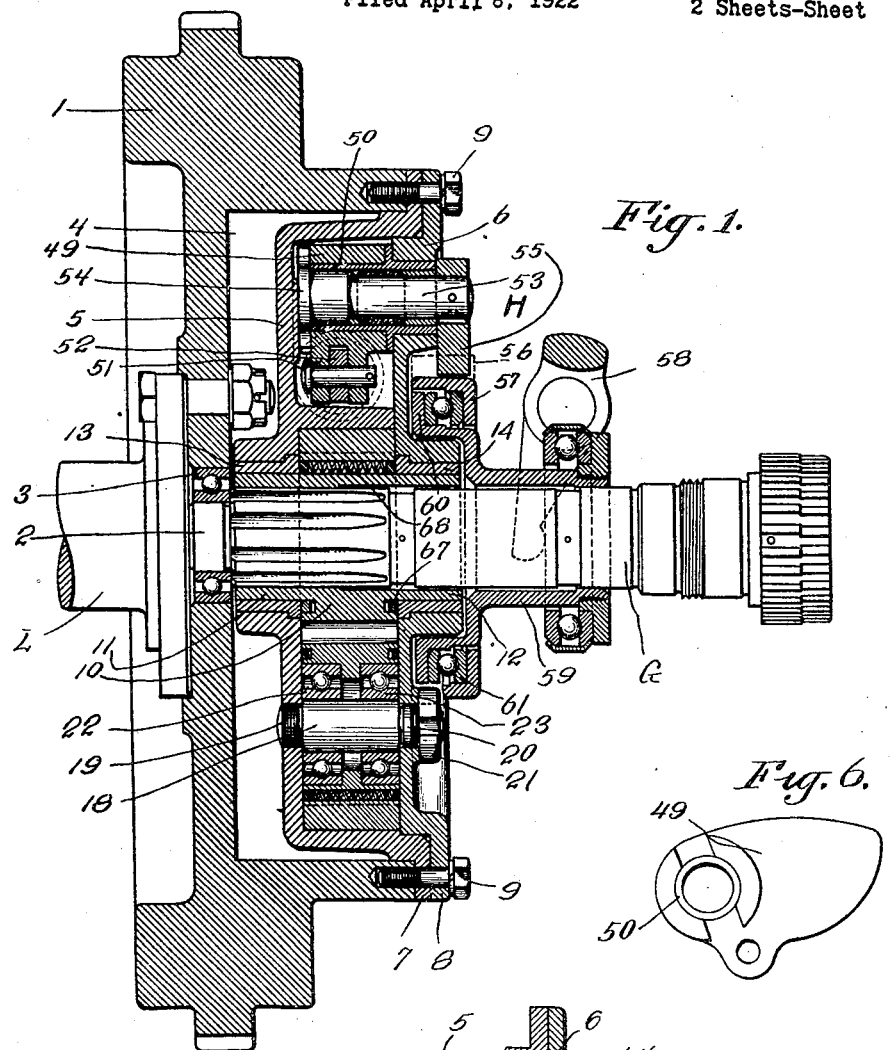
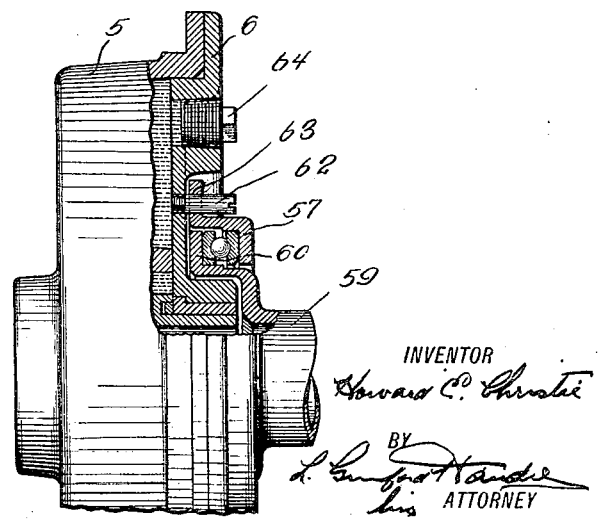
INVENTOR
Howard E. Christie
BY
ATTORNEY Oct. 23, 1928.  
H. E. CHRISTIE  
CLUTCH DEVICE  
Filed April 8, 1922 2 Sheets-Sheet 2
1,688,852
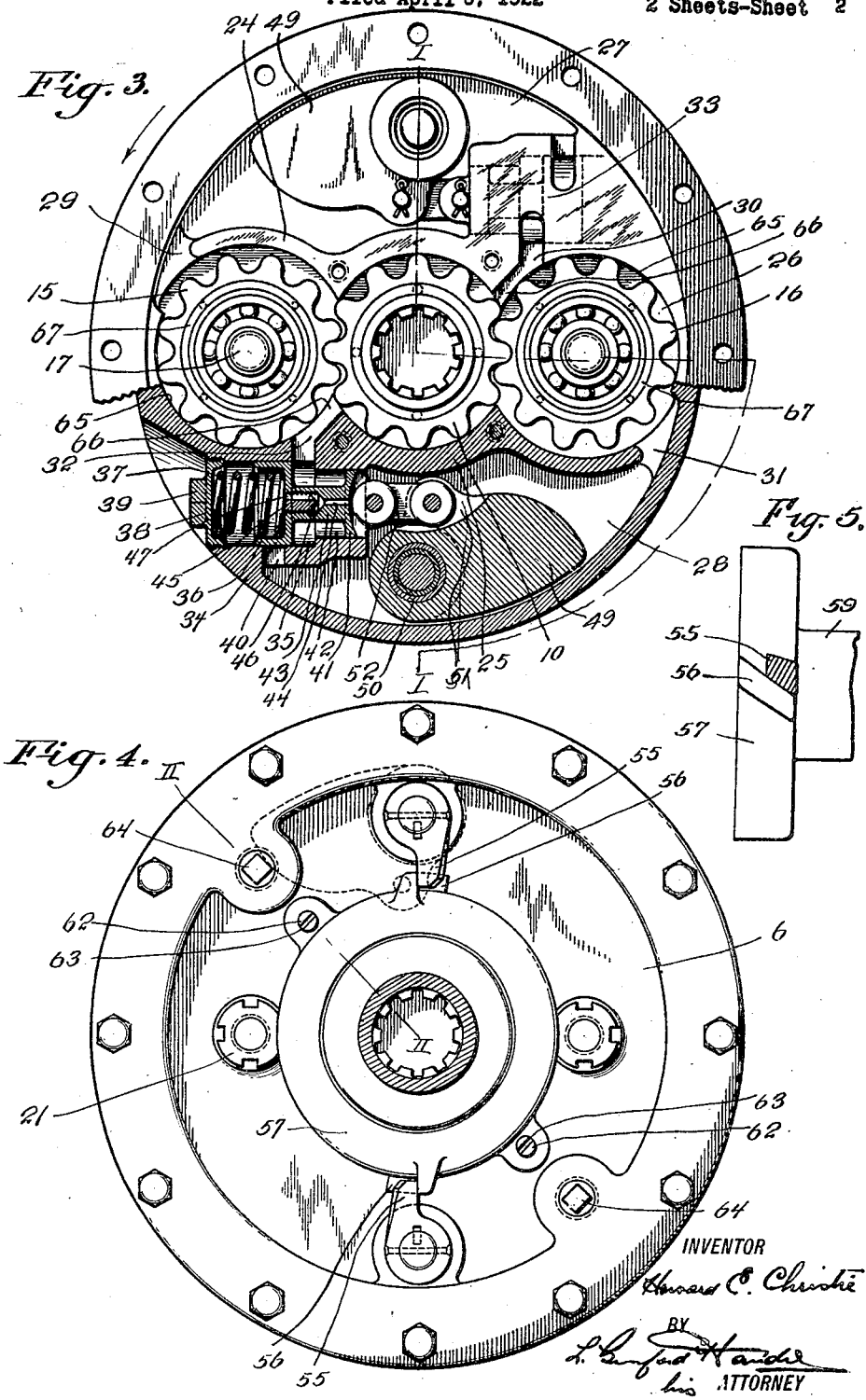
INVENTOR  
Howard E. Christie  
BY  
his ATTORNEY Patented Oct. 23, 1928.

1,688,852

UNITED STATES PATENT OFFICE.

HOWARD E. CHRISTIE, OF BRONX, NEW YORK.

CLUTCH DEVICE.

Application filed April 8, 1922. Serial No. 550,641.

This invention relates to a clutch device, and particularly to one in which a liquid, preferably oil, is utilized for controlling the functions thereof.

An object of the invention is to provide a clutch device which is primarily intended for use in the driving connections of automobiles, and like structures, and which will automatically operate to maintain a substantially uniform torque on the engine at varying speeds and under changing load, thus practically dispensing with the necessity for the speed-changing gears and like contrivances now commonly employed in automobile construction for this purpose.

A further and more detailed object is to provide a clutch of this type having valves therein for controlling the movement of the liquid and having elements operated by centrifugal force and connected with said valves for in turn controlling the movements of said valves.

A further object is to provide means whereby the valves may be manually operated at will.

Other objects and aims of the invention, more or less specific than those referred to above, will be in part obvious and in part pointed out in the course of the following description of the elements, combinations, arrangements of parts and applications of principles, constituting the invention, and the scope of protection contemplated will be indicated in the appended claims.

In the accompanying drawings which are to be taken as a part of this specification, and in which I have shown merely a preferred form of embodiment of the invention:—

Figure 1 is a longitudinal sectional view substantially upon the plane of line I—I of Fig. 3, and showing the clutch device as it appears associated with the driving shaft, fly wheel, and tail shaft of an automobile.

Figure 2 is a fragmentary elevational view of a portion of the clutch device detached, and shown partly in transverse section substantially upon the plane of line II—II of Fig. 4.

Figure 3 is a front elevational view of the clutch mechanism, the face plate thereof being removed and the lower portion of said view being shown in vertical section.

Figure 4 is a front elevational view of the clutch with the face plate attached.

Figure 5 is a fragmentary plan view of a portion of the elements for manual control, and Figure 6 is a fragmentary detail view illustrating the manner in which the centrifugally operated elements are connected with their manual control means.

Referring to the drawings for describing in detail the structure which is therein illustrated, the reference character L indicates the engine shaft to which is rigidly connected the usual fly wheel 1.

The tail shaft, as G, which, it will be understood, is the shaft which ordinarily extends from the usual clutch mechanism toward the rear of an automobile and into the variable speed gear housing, has its forward end, as 2, rotatably mounted within the fly wheel 1 axially of the engine shaft L, a suitable anti-friction bearing, as 3, being provided as a mounting for said end 2.

The rear face of the fly wheel is preferably formed with a cavity, as 4, therein into which is fitted the clutch mechanism, indicated generally by the reference character H, with which this invention is essentially concerned.

The clutch mechanism H comprises a housing made up of a main, or body, member 5 and a face plate, or cover, 6. These members are formed with annular marginal flange parts 7 and 8 respectively which are rigidly held together and to the fly wheel by a series of clamp screws 9.

Within this housing is mounted a central gear 10 connected to rotate at all times as one with the shaft G. Preferably the shaft G is longitudinally fluted within the gear, the gear being formed interiorly with a corresponding series of ribs for engaging within the flutes of the shaft. The gear has bearing extensions, as 11 and 12, at its opposite sides which continue thru the body 5 and face plate of the housing, being received in appropriate bearings 13 and 14 of said housing parts respectively.

At opposite sides of the gear 10 are two other gears, as 15 and 16, which may, for convenience, be termed "pumping gears". These are journaled to rotate upon cross shafts 17 and 18 respectively which are rigidly connected by their opposite ends to the parts 5 and 6 of the housing.

One end, as 19, of each of these shafts is preferably threaded into the body part 5 of the housing, while the opposite end, as 20, extends thru the face plate 6 and carries a nut 21, said shafts and nuts in this manner being made to constitute clamp elements effective for holding the central portions of the parts 5 and 6 against possible spreading apart under the strains to which they are subjected in use.

Suitable anti-friction bearings, as 22 and 23, are provided between the shafts and gears 15 and 16.

The interior of the housing is provided with two transversely extending partition walls 24 and 25 dividing said interior into a central, or gear, compartment 26 and two opposite oil compartments, 27 and 28. The three gears already referred to are contained within the compartment 26 and the walls of said compartment are so shaped that the gears rotate in constant and tight engagement with certain parts thereof, as will be described.

The partition 24 is provided with two openings, as 29 and 30, giving communication between the oil compartment 27 and the gear compartment, while the partition wall 25 is formed with openings 31 and 32 giving communication between the gear compartment and the oil compartment 28.

The openings 30 and 32 are controlled by valves 33 and 34 respectively. These are of identical construction and operation, and a detailed description of one will apply to both, as follows:—

Within a cylinder, as 35, is mounted a slide valve head 36. Behind this valve head is a compression spring 37, the rear end of which abuts against a cap 38 closing the rear end of the cylinder. This cap is threaded into position, its outer surface is nut shaped, as indicated at 39, and it is disposed so that it is readily accessible from without the housing, said cap being thus readily adjustable for altering the pressure of the spring against the valve head.

The opening 32 enters the cylinder 35 in front of the valve head, and a second opening, as 40, communicating with the chamber 28, enters the cylinder at a point spaced backwardly of the forward face of the valve head.

Spaced forwardly of the valve head 36 is a second valve head 41 of relatively reduced diameter and being slidably fitted into a reduced portion, as 42, of the cylinder 35.

The valve heads 36 and 41 are rigidly connected together by a stem 43 longitudinally thru which is formed a passage 44 giving communication between the compartment 28 and the space within the cylinder 35 back of the valve head 36. The size of this passage 44 is determined by an adjustable plug element 45 which is threaded into an enlarged portion of said passage. This plug is provided with a cone-shaped portion 46 which is disposed in opposition to the end of the reduced portion of the passage and which will close the passage more or less in accordance with the position of the plug. A suitable groove, as 47, extends along the side of the plug for providing a continuation of the passage past the plug.

Within the compartment 28 is a weight 49, said weight being pivotally mounted by one end upon a hollow shaft 50, the axis of which is substantially parallel to the axis of the shaft G.

At one side of the shaft 50 this weight is provided with a pair of ears 51 between which is pivotally mounted a link 52 which extends into pivotal connection with the inner end of the valves 34 and 41.

Within the shaft 50 is mounted a rod 53 having a head 54 at its inner end within the housing shaped to interengage with the weight 49 so that said rod will at all times rotate as one with said weight. This rod extends exteriorly of the housing thru the face plate 6 and has fixed thereto an arm 55 which is arranged to be engaged and operated by a cam 56 carried upon a ring 57.

The ring 57 is provided with two of the cams 56 arranged at diametrically opposite points thereon, one for each of the arms 55 of the valve mechanisms described, as will be clearly understood from an inspection of Fig. 4. It is arranged to be moved in a direction longitudinally of shaft G by means of the usual manual control lever device, as indicated by the reference numeral 58.

As indicated, this lever 58 is arranged to engage the rear end of a sleeve 59 which surrounds the shaft G and which has its forward end provided with a flange 60 extending into the ring 57. A suitable anti-friction thrust bearing device, as 61, is interposed between the flange 60 and ring 57 so that the ring may be free to rotate with the housing H without necessity for rotating the sleeve 59.

Guide pins 62, carried by the face plate 6 of the housing, are arranged to extend thru openings 63 provided for this purpose in the ring to insure rotation of the ring with the housing, while at the same time permitting free movement of the ring toward and away from the housing.

In use the entire interior of the housing H will be filled with oil. One or more suitable plugs, as 64, may be provided for filling and cleaning purposes.

Assuming that the device, as thus constructed and filled with oil, is mounted upon a car which is moving freely at a considerable speed along a substantially level road. Under this condition the force, or power, of the engine is rotating the shaft L and housing H and is tending to rotate said housing about the shaft G. The pressure of springs 37, however, is sufficient to maintain the valves 33 and 34 closed so that no oil can pass outwardly from the gear compartment thru either of the openings 30 or 32. Rotation of the gears 15 and 16 in a contra-clockwise direction about their supporting shafts is thus prevented, it being noted that the wall portions, as 65, of the partitions 24 and 25 are shaped to fit closely to the teeth of said gears in the spaces between the openings 29—32 and 31—30. Oil carried inwardly by the teeth of the gears 15 and 16 and along said wall portions 65 from the openings 29 and 31 will be caught in pockets, as 66, where the teeth of said gears mesh with the teeth of the gear 10, and will be held in said pockets, and will consequently lock all of the gears against rotation relative to each other until released by opening movement of the valves 33 and 34.

It should be here noted that pressure of the oil itself against the rear surface of the valve head 41 partially counter-balances the pressure against the forward surface of valves 34 and thereby materially assists the spring 37 in its effort to hold the valve 34 closed.

Assume now that the vehicle begins to ascend an incline: Due to the increased resistance to rotation of the shaft G, the effort of the engine to maintain its speed will immediately increase the pressure of the oil within the pockets 66 and against the valve heads 36 and 41. The power of the springs 37 being overcome and the heads 36 being of greater area the valves will be moved backwardly to uncover, to a greater or less extent, the openings 40, thereby releasing a portion of the oil from the pockets 66 and allowing the gears 15 and 16 to rotate about their carrying shafts and to rotate, with the housing, bodily around the shaft G and gear 10, said gears 15 and 16 meanwhile, of course, pumping in more oil thru the openings 29—31 to maintain the pockets 66 charged.

The extent to which the openings 40 are uncovered will determine, at all times, the speed at which the housing will rotate about the shaft G and gear 10.

As the valves open they, of course, swing the weights 49 inwardly against the centrifugal power of said weights and this power continues thereafter to exert itself for returning the valves to closed position with a force relative to the speed of rotation of the housing.

It will be apparent, therefore, that by properly proportioning the two opposing powers; that is, 1st, the power of the oil from pockets 66 to open the valves, by pressure against the head 36, and 2nd, the power of the same oil against the head 41, and of the spring 37 and weight 49, to close the valves, then the speed of the engine, in proportion to the resistance to rotation of gear 10, may be made automatically to change from time to time under varying loads so as thus to increase the power of the engine in degree as nearly as possible commensurate with the amount of added work to be performed. It is desirable that these powers be proportioned so that when a slight incline is being negotiated the valve will open to a slight degree and allow the housing to rotate sufficiently faster than the gear 10 so that the correspondingly increased speed of the engine will generate just the proper amount of power for ascending the incline. As a steeper incline is being negotiated, and a correspondingly greater relative speed of the engine is necessary to maintain sufficient power, then the valves will open further to permit passage of the necessary oil therethru.

It is important to note that the weights 49, being carried by the housing, always rotate with the engine and that their power for closing the valves, generated by centrifugal force, is greatest in proportion to the speed of the engine. Hence, the greater the speed of the engine the greater the pressure required of the oil within pockets 66 to hold the valves open, which is, of course, necessary when a heavy resistance is present to the rotation of gear 10.

In another sense, the weights 49 may be considered safety devices against racing of the engine, since their power to prevent racing is controlled by centrifugal force.

It is further important to note that the movements of the valves are accompanied by back and forth passage therethru of oil along the passages 44, and that the size of said passages, which, as before mentioned, may be readily altered, will determine, to a satisfactory extent, the speed of movement of the valves. Any sudden or abrupt changes are thus avoided, and an even action of the mechanism always assured.

In order that there may be no movement of oil across the side faces of the gears 15 and 16, or outwardly from the housing along the bearing extensions 11 and 12 of gear 10, all of said gears are preferably provided with packing rings, as 67, in their opposite faces spring pressed outwardly, as by springs 68, into tight engagement with the adjacent face portions of the housing parts 5 and 6.

With a clutch mechanism as herein described installed as a part of the driving connections for a vehicle, it will seldom be necessary to shift the usual speed changing gears of the vehicle since, as has already been made apparent, the present mechanism will at all times operate automatically for increasing the torque of the engine as added work is required to be performed.

Even when the vehicle is starting from a stand still position it usually is not necessary for the variable speed mechanism to be adjusted into other than its so-called high-speed position. In this condition the effort of the engine to start the vehicle is opposed by strong resistance in the shaft G so that the pressure within the pockets 66 will be so great as readily to force open the valves and allow the engine to speed up to a desirable extent. As the speed is increased so also is increased the centrifugal force upon the weights 49 causing said weights to apply an increasing force for closing the valves. A balance is thus attained and maintained in which the maximum power of the engine is applied directly for rotating the shaft G.

Also, during the driving of the vehicle, if more gas be fed so that the engine will rotate faster, this added power immediately will increase the pressure in the pockets 66 and open the valves. The weights 49, having greater centrifugal force than before, will pull strongly to close the valves, and thus the movement of oil past the valves will be gradually shut off as the speed of movement of the vehicle, and the consequent speed of rotation of the gear 10, increases. The changes in this mechanism from one condition to another are always gradual, and thus the changes in the torque of the engine are likewise gradual, and a smooth, even running vehicle is thus assured.

Whenever it is desired that the effect of the centrifugal force of weights 49 be eliminated, and that the valves be made to stand open as may occur when the driving connection between the engine and the shaft G is to be entirely eliminated, or when the speed changing gears of the vehicle are shifted into so-called low gear for negotiating very steep inclines, or the like, then the manually operable element 58 may be moved to draw backwardly the ring 57 and for thus forcing the weights 49 toward the center of the clutch and for holding the valves open.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A clutch mechanism with which to connect an engine with a work shaft, said mechanism comprising a housing adapted to rotate with the engine, means dividing the housing into a plurality of compartments, a plurality of gears contained in one of said compartments, the other compartments being adapted to contain a fluid, one of said gears being connected to rotate with the work shaft and the other gears being carried by the housing and being in constant mesh with the first gear, valves for controlling passage of the fluid thru said gear compartment, said gears and the walls of the gear compartment being arranged so that said gears may rotate relative to each other only while fluid is passing thru the gear compartment, spring means exerting a constant tendency to close said valves, and auxiliary means for closing said valves comprising centrifugally operated members carried by the housing and being connected with the valves.

2. A clutch mechanism with which to connect an engine with a work shaft, said mechanism comprising a housing adapted to rotate with the engine, means dividing the housing into a plurality of compartments, a plurality of gears contained in one of said compartments, the other compartments being adapted to contain a fluid, one of said gears being connected to rotate with the work shaft and the other gears being carried by the housing and being in constant mesh with the first gear, valves for controlling passage of fluid thru said gear compartment, said gears and the walls of the gear compartment being arranged so that said gears may rotate relative to each other only while fluid is passing thru the gear compartment, spring means exerting a constant tendency to close said valves, and auxiliary means for closing said valves comprising centrifugally operated members carried by the housing and being connected with the valves, together with means for insuring gradual movement of the valves at all times.

3. A clutch mechanism with which to connect an engine with a work shaft, said mechanism comprising a housing adapted to rotate with the engine, means dividing the housing into a plurality of compartments, a plurality of gears contained in one of said compartments, the other compartments being adapted to contain a fluid, one of said gears being connected to rotate with the work shaft and the other gears being carried by the housing and being in constant mesh with the first gear, valves for controlling passage of the fluid thru said gear compartment, said gears and the walls of the gear compartment being arranged so that said gears may rotate relative to each other only while fluid is passing thru the gear compartment, said valves being of the piston type and each having opposed heads of different diameters between which fluid from the gear compartment enters, the valve parts being arranged so that the pressure of said fluid against the larger head will tend to open the valve while the pressure of the same fluid against the smaller head will tend to close the valve, together with centrifugally operated means carried by the housing and being connected with said valves also tending to close said valves.

4. A clutch mechanism with which to connect a drive shaft with a driven shaft, said mechanism comprising a housing adapted to contain a fluid, a rotor whose rotation depends upon movement of said fluid, a piston valve for determining movement of said fluid, said valve having parts of uneven surface extent subject to pressure of said fluid tending to operate said valve, and centrifugally controlled means also tending to operate said valve.

5. A clutch mechanism with which to connect a drive shaft with a driven shaft, said mechanism comprising a housing adapted to contain a fluid, a rotor whose rotation depends upon movement of said fluid, a piston valve for determining movement of said fluid, centrifugally operated means tending to move said valve to closed position, and said valve having spaced heads between which pressure of the fluid is exerted one of said heads being of greater surface extent than the other whereby pressure of the fluid will tend to move the valve toward open position.

6. A clutch mechanism with which to connect a drive shaft with a driven shaft, said mechanism being fluid pressure controlled and comprising a valve arranged to receive pressure from the fluid tending to open the valve, together with centrifugally operated means tending to close the valve, and means manually operable for opening said valve.

In testimony whereof I affix my signature.

HOWARD E. CHRISTIE.